May 14, 1935.  A. C. JAMIESON  2,001,025
MEASURING AND DELIVERING APPARATUS
Filed Nov. 21, 1933  5 Sheets-Sheet 1
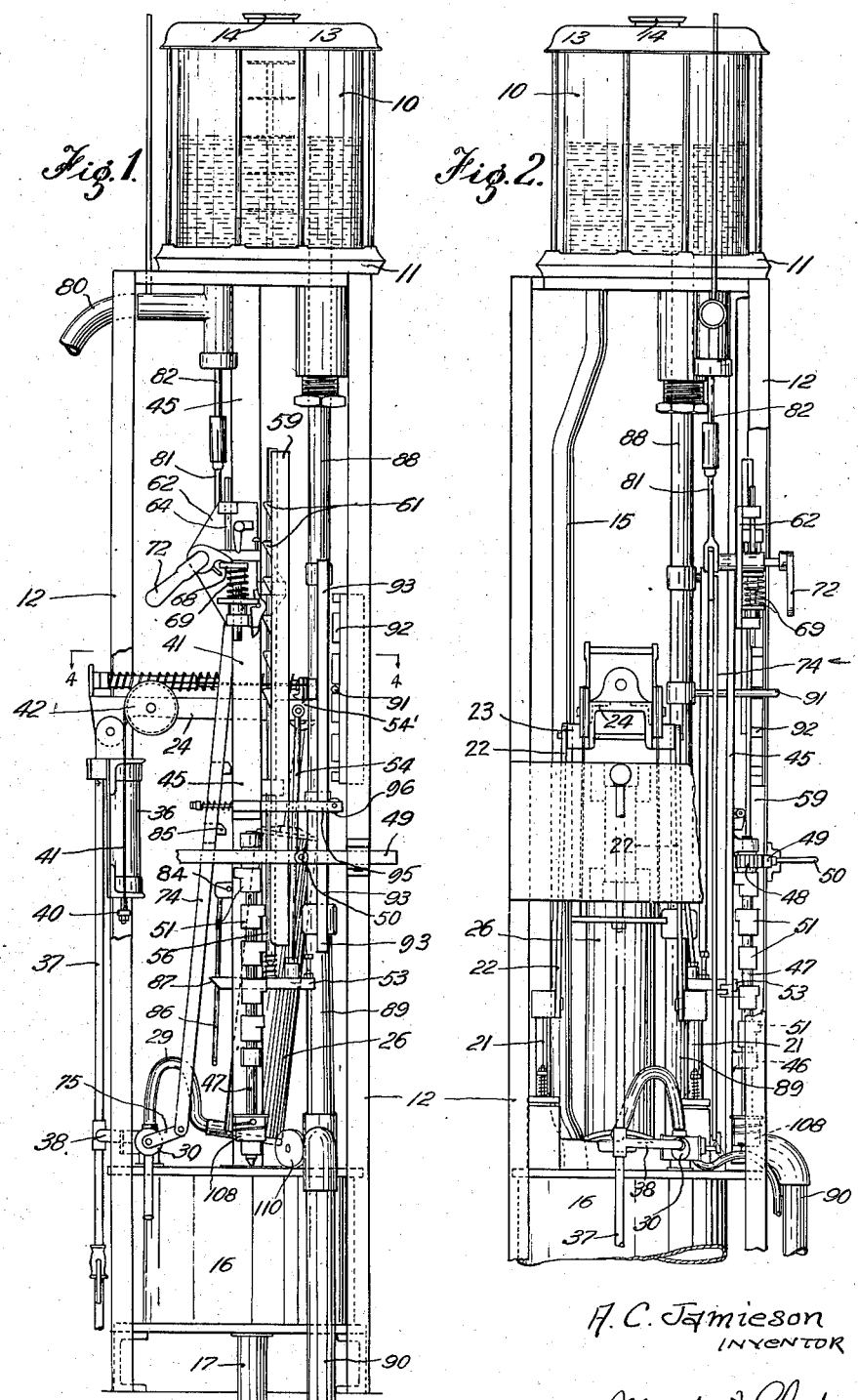
A. C. Jamieson
INVENTOR
By Marks & Clerk
Attys.

May 14, 1935.  A. C. JAMIESON  2,001,025
MEASURING AND DELIVERING APPARATUS
Filed Nov. 21, 1933  5 Sheets-Sheet 2
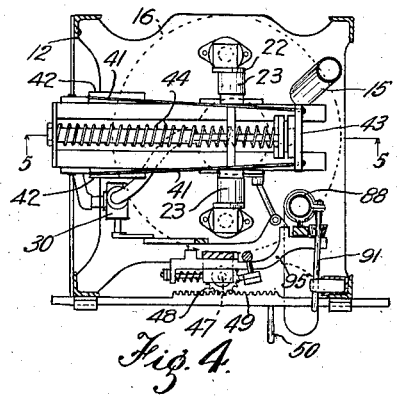
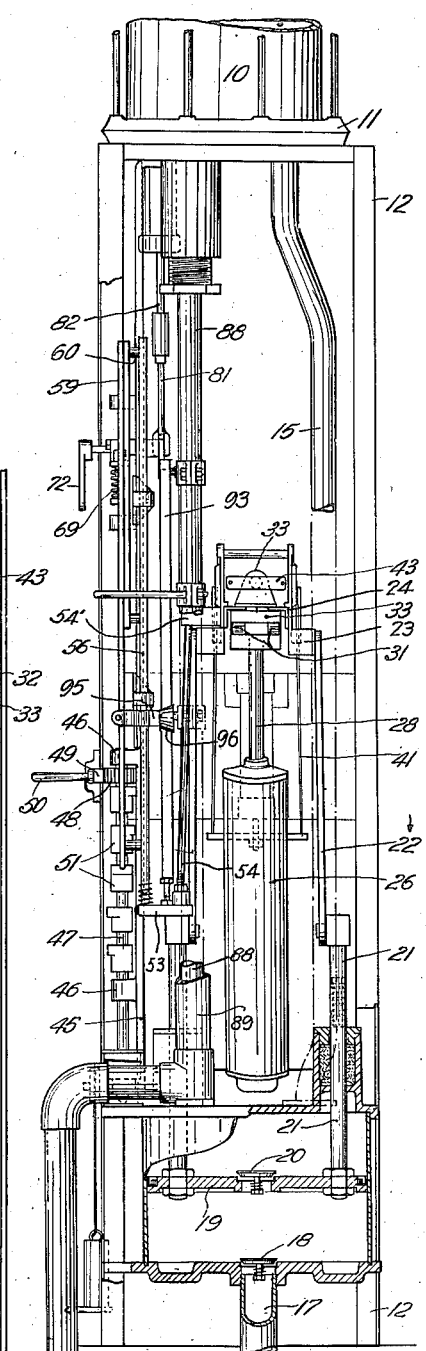
A. C. Jamieson
INVENTOR
By: Marks & Clark
ATTYS.

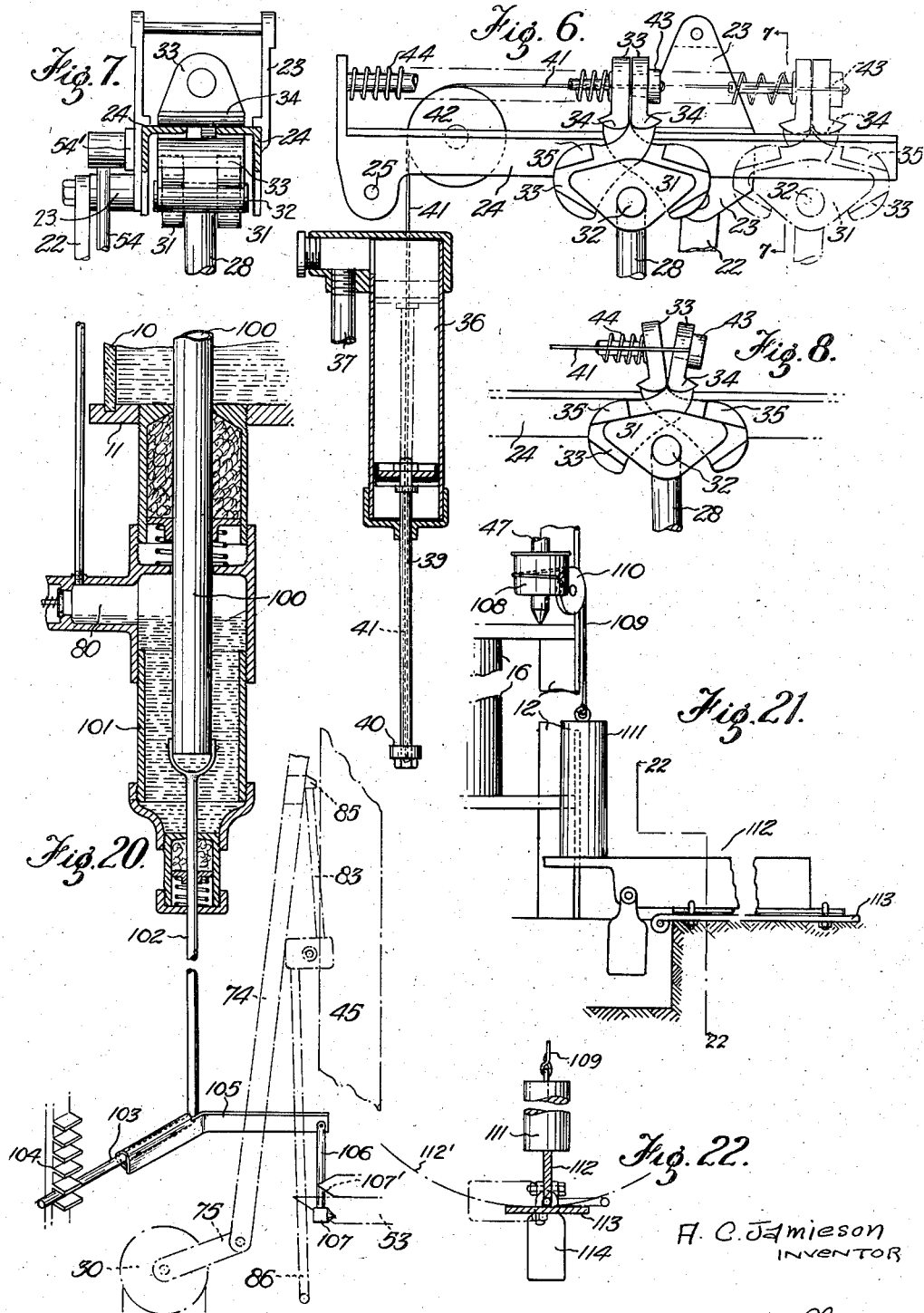

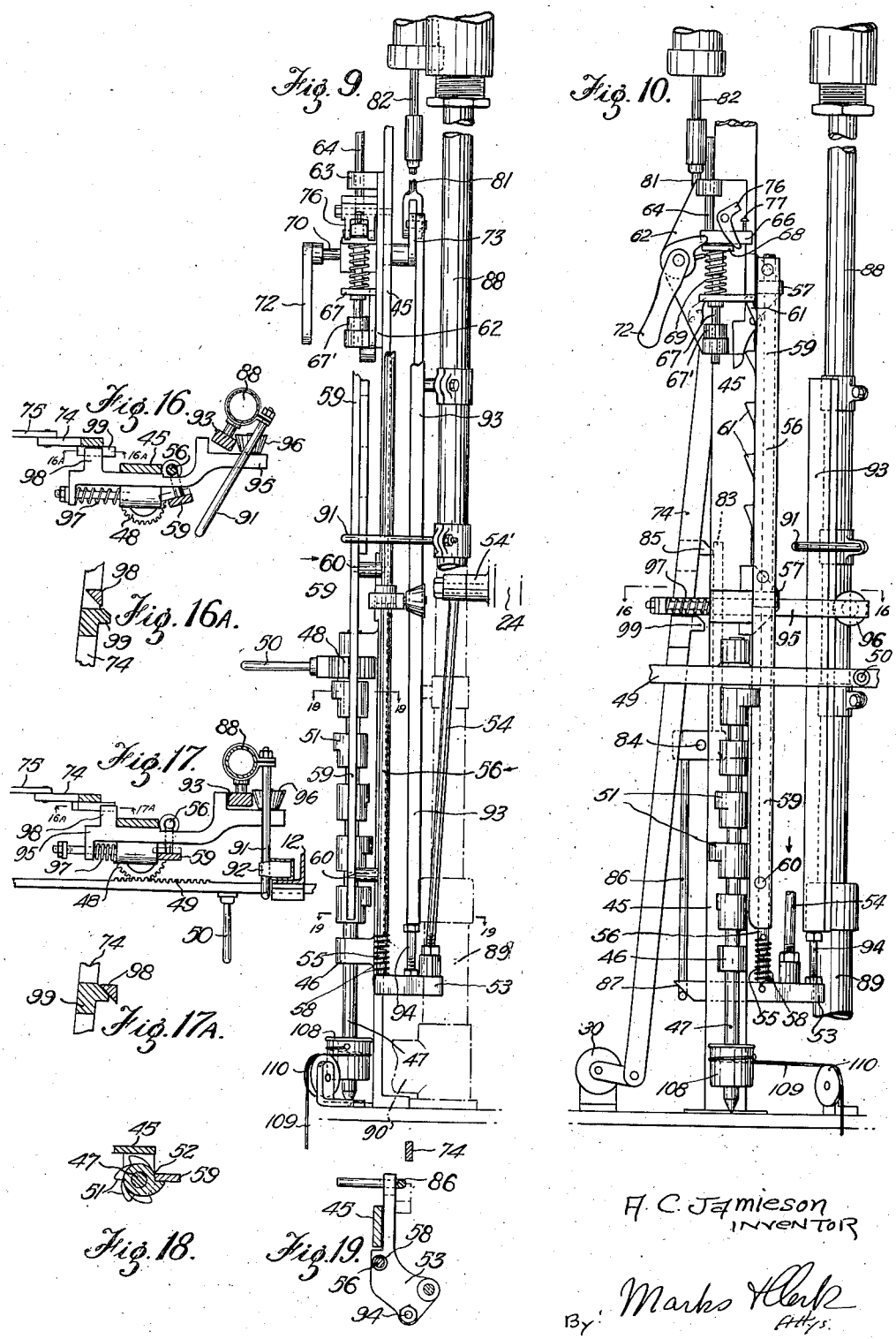

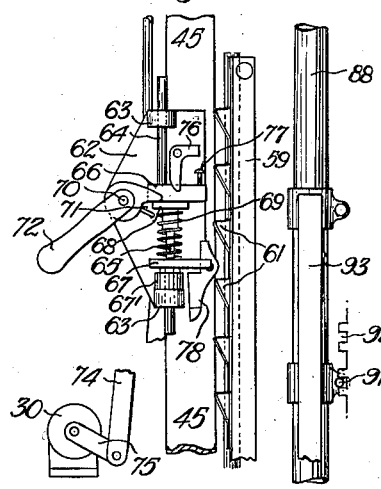

Patented May 14, 1935

2,001,025

UNITED STATES PATENT OFFICE 2,001,025

MEASURING AND DELIVERING APPARATUS

Aubrey Carlyle Jamieson, Kew, Victoria, Australia

Application November 21, 1933, Serial No. 699,063
In Australia November 25, 1932

23 Claims. (Cl. 221—100)

This invention relates to improvements in and connected with measuring and delivering apparatus for petrol and other liquids and refers especially to petrol pumps of the type employed by garage men for supplying petrol to motorists at the roadside or other locations.

This type of apparatus ordinarily is provided with an elevated transparent bowl having suitable means for accurately measuring therein a desired quantity of petrol which is forced thereinto from a reservoir by means of a hand pump and the measured quantity of petrol is delivered from the bowl into a receptacle—as e. g. the fuel tank of an automobile—through a discharge pipe upon the opening of a control cock.

A disadvantage of this type of apparatus is that the pump is manually operated with the result that the pumping of the petrol into the bowl is laborious and requires an appreciable time, so that delay and inconvenience often occur.

Now, the object of the present invention is to provide simple and efficient means whereby a desired quantity of petrol will automatically be forced into the measuring bowl either by the setting of a handle or by the action of an automobile as it approaches or stops alongside the measuring and delivery apparatus, thereby enabling the transfer of the measured quantity of petrol to the fuel tank to be expeditiously effected and with a minimum amount of labor and attention on the part of the attendant.

The invention briefly consists in providing apparatus having a pump for supplying liquid from a reservoir to a receptacle such as a bowl, power actuated means for operating said pump, manually controlled means (such as a hand or ground lever) for initiating the operation of the power actuated means and for predetermining the volume of liquid to be delivered to the receptacle and automatic control means co-operating with the selecting means for discontinuing the operation of the pump when a predetermined volume of liquid has been delivered to the receptacle.

The pump operating means may embody a cylinder to which air or water under pressure is adapted to be delivered under the control of a valve which is opened by manual control and closed by said automatic control means, said cylinder having a plunger which actuates the pump either directly or through intermediate mechanism.

The automatic control means embodies a member which is moved progressively during the actuation of the pump (i. e. proportionately to the delivery of the liquid to the receptacle) whereby, after undergoing a movement which is predetermined by the selecting means, the supply of pressure fluid to the operating cylinder is cut off by said member, and preferably this progressively movable member consists of a rod which is movable vertically to a position determined by one of a series of vertically arranged selector cams.

A hand lever is provided to control the discharge of the measured volume of liquid from the bowl to a fuel tank or other receptacle and to simultaneously open to discharge the valve of the driving cylinder whereby the parts will return to the normal or inoperative position.

The driving cylinder is preferably associated with mechanism for compensating for variations in the pressure of the compressed fluid supplied to said cylinder and said compensating mechanism may comprise manual or automatic means for adjusting the position of a pivotal connection between the piston rod of the driving cylinder and a pivoted lifting arm to which the pump plunger is connected.

An important, though not essential, feature of the invention resides in the provision of a pump having a displacement volume at least as large as the maximum effective capacity of the receptacle into which the petrol is delivered whereby one stroke of the pump may raise sufficient petrol to fill the said receptacle.

The driving cylinder is also preferably so arranged that one stroke of the piston thereof may cause sufficient petrol to be raised to fill the receptacle.

A further feature of the invention resides in providing means for automatically raising an overflow pipe in the receptacle to a position corresponding to the volume of liquid to be pumped into the receptacle, said overflow pipe being also manually adjustable to accurately gauge the volume to be supplied from said receptacle.

A still further feature of the invention resides in the provision of automatic locking and interlocking means for ensuring that certain operations are effected in predetermined sequence.

Other novel features of the invention are set forth in the following detailed description.

Having set forth the object and nature of the invention, reference will be made to the accompanying drawings which illustrate preferred forms of the invention, and in which:—

Figure 1 is a front elevation of a petrol measuring and delivery apparatus constructed in accordance with the present invention.

Figure 2 is a view in elevation of the left-hand side of the apparatus shown in Figure 1, portions being broken away for convenience of illustration.

Figure 3 is a view in elevation of the right hand side of the apparatus shown in Figure 1.

Figure 4 is a sectional plan view taken on the line 4—4 of Figure 1.

Figure 5 is a sectional elevation taken on the line 5—5 of Figure 4 and is drawn to a larger scale.

Figure 6 is a fragmentary side elevation of the toggle mechanism connecting the piston rod with the lifting arm.

Figure 7 is a view in sectional end elevation taken on the line 7—7 of Figure 6.

Figure 8 is a view of the toggles when in locking engagement with the lifting arm.

Figure 9 is a side elevation of the selecting and valve control mechanism.

Figure 10 is a view in front elevation of Figure 9 and shows the selecting and valve control mechanism in its neutral or all closed position.

Figures 11 and 12 are front elevations of the valve control mechanism the parts being disposed in filling and partly closed positions respectively.

Figure 13 is also a view in front elevation of the valve control mechanism and shows the parts in the positions assumed when the petrol is being discharged from the bowl.

Figure 14 is a fragmentary view partly in section and illustrating the petrol delivery valve and portion of the control means therefor.

Figure 15 illustrates valve control mechanism of modified construction.

Figure 16 is a view in sectional plan taken approximately on the line 16—16 of Figure 1 and shows interlocking mechanism associated with the valve control mechanism.

Figure 16A is a fragmentary view in sectional elevation taken on the line 16—16 of Figure 16.

Figure 17 is a view similar to Figure 16 and shows the interlocking mechanism in a different position.

Figure 17A is a fragmentary view in sectional elevation taken on the line 17—17 of Figure 17.

Figure 18 is a view in sectional plan taken on the line 18—18 of Figure 9 and showing the selector cams and associated control bar.

Figure 19 is a section on the line 19—19 of Figure 9 and shows the lifting block in plan.

Figure 20 illustrates a modified arrangement for delivering petrol from the measuring bowl.

Figures 21 and 22 are detail views of a road lever for automatically operating the selector mechanism.

Figure 23 is a view in cross section of a three way valve.

Referring now to the drawings, the reference numeral 10 designates an elevated petrol measuring bowl consisting of a graduated cylinder of transparent glass mounted on a bottom plate 11 which is supported on suitable framework or standards 12.

A cover 13 fitted to the upper end of the measuring bowl is provided with an air hole which is preferably fitted with a whistle 14 whereby, when petrol enters the bowl, the displacement of air through said hole causes an audible signal to be given.

The discharge of petrol from the bowl 10 is effected by means of valve 79 under the control of a hand lever 72 (Figure 14) through the medium of mechanism which is subsequently described, whereby the petrol may pass through a passage 80 to a supply pipe (not shown).

The bottom plate 11 of the measuring bowl is connected by a pipe 15 to the upper end of a petrol pump cylinder 16 arranged vertically at the lower end of the standards 12 (Figures 1 to 3) and the lower end of the cylinder is connected by a pipe 17, provided with a non-return valve 18, to an underground storage tank (not shown).

A plunger 19 slidably mounted in the pump cylinder 16 is fitted centrally with a non-return valve 20 and a pair of diametrically opposed plunger rods 21 secured to the plunger project upwards through packing glands in the upper end of the cylinder and are connected as hereinafter described to the power operating unit.

It will thus be seen that, when the pump plunger moves downwards, petrol passes through the valve 20 to the upper end of the cylinder and, when said plunger is raised, petrol from the upper end of the cylinder is delivered through the pipe 15 into the measuring bowl 10, whilst, at the same time, petrol passes from the reservoir into the lower end of the pump cylinder through the non-return valve 18.

An important feature of this invention resides in the displacement volume of the petrol pump 16 being at least equal to the maximum effective volume of the measuring bowl—i. e. to the maximum volume, say 5 gallons, to be measured at one operation, whereby a single upward movement of the pump plunger 19 may raise sufficient petrol to fill the bowl to its maximum capacity.

After being actuated, the pump plunger always returns to a fixed position at the lower end of the cylinder 16 and the height to which said plunger is raised when the apparatus is actuated is automatically controlled by selector mechanism to which reference will later be made and which is manually set to cause a predetermined and variable volume of petrol to be supplied to the measuring bowl 10.

It will be clear, therefore, that a single upstroke of the petrol pump plunger 19 serves to supply the requisite volume of petrol to the measuring bowl and that said upstroke is variable in length and automatically controlled according to the volume of petrol required in the bowl and determined by the said selector mechanism.

*Power unit*

The projecting upper ends of the plunger rods 21 of the petrol pump are pivoted to the lower ends of a pair of connecting rods 22 the upper ends of which are pivoted to brackets 23 secured to a lifting arm 24 which is pivoted at one end to a horizontal spindle 25 on the standards 12 (Fig. 5).

A lifting cylinder 26 is oscillatively mounted at its lower end on a narrow support 27 on the upper end of the pump cylinder 16 and a piston in the cylinder is fitted with a piston rod 28 which projects from the upper end thereof (Figure 5).

The lower end of the lifting cylinder is connected by flexible tubing 29 to a three way valve 30 which controls the supply and discharge of a fluid under pressure (such as water or air) whilst the upper end of the cylinder is provided with an air hole.

The piston rod 28 is pivotally connected to the lifting arm 24 by means of a movable pivot, hereinafter described, whereby the leverage exerted on said lifting arm may be varied to suit the pressure of the operating fluid supplied to the lifting cylinder 26.

For this purpose a pair of wedging blocks 31 are pivotally mounted on a cross T 32 at the upper end of the piston rod 28 and these blocks are enclosed within the lower ends of an opposed pair of scissors-like gripping levers 33 which are slidably mounted on the lifting arm 24 whereby they may be moved towards and from the pivot spindle 25 thereof (Figures 5 to 8).

For this purpose the lifting arm 24 may conveniently be formed of an opposed pair of bars of angle section having a narrow slot therebetween and through which the gripping levers 33 project (Figure 7).

Each gripping lever 33 is provided above the lifting arm 24 with a pair of spaced projections 34 arranged to engage the upper surface of the lifting arm and similarly each of the levers 33 below the lifting arm is provided with a pair of spaced projections 35.

Now, when water or air under pressure is supplied to the lower end of the lifting cylinder 26 and the piston rod 28 is raised, it will be clear that the upper tapered surfaces of the wedging blocks 31, by engaging the coacting surfaces of the gripping levers 33, cause said levers to open somewhat and firmly clamp the lifting arm 24 between the projections 34 and 35 thereon (see Figure 8).

When, however, the lower end of the lifting cylinder 26 is opened to exhaust and the upward pressure of the wedging blocks 31 is relieved, said gripping levers 33 automatically tend to close by means to be described, thus releasing the clamping pressure on the lifting arm and consequently enabling said gripping levers and the wedging blocks 31 to slide freely along the lifting arm.

A vertical cylinder 36, which is fixed to the standards 12 adjacent to the pivotal support for the lifting arm, has its upper end permanently connected to the pressure fluid (water or air) by means of a pipe 37, a branch 38 from which leads to the three-way valve 30 (Figures 1, 2, 5 and 6).

A piston rod 39 projecting downwards from a piston in the cylinder 36 has its lower end fitted with a cross bar 40 to which the lower ends of a pair of flexible connections 41 are attached.

These flexible connections 41 pass upwards around grooved guide pulleys 42 on the lifting arm to the outer ends of a cross bar 43 fitted to the upper end of the outermost gripping lever 33.

A compression spring 44 supported on telescopic guides is arranged between the upper end of the inner gripping lever 33 and an abutment at the pivoted end of the lifting arm, and it will be clear that, when the wedging blocks 31 are not thrust upwards, the pressure exerted on the upper ends of the gripping levers by the spring 34 and the flexible connections 41, serves to maintain said gripping levers closed and free to slide along the lifting arm.

From the foregoing description, it will be understood that, if the pressure of fluid supplied to the upper end of the cylinder 36 should increase, the piston therein will be depressed, thus imparting a tension to the flexible connections 41 and (provided they are not clamped by the wedging blocks 31) causing the gripping levers to slide inwards along the lifting arm 24 against the action of the spring 44 until the resistance of the spring balances the inward pressure. If the pressure of the operating fluid should decrease, a reverse movement automatically takes place, with the result that the leverage exerted on the lifting arm 24 by the piston rod 28 of the lifting cylinder 26 is automatically adjusted to correspond with the available pressure, thus effectively utilizing the energy of the operating fluid and obviating wastage when a high pressure is available—a feature which is of particular importance where a fluid of relatively high cost, such as compressed air, is utilized.

Reviewing the operation of the mechanism so far described, it will be understood that, when the three-way valve 30 is moved to the open—i. e. the filling—position to cause the pressure fluid to be delivered to the lower end of the lifting cylinder 26, the piston therein commences to rise and the wedging blocks 31 on the upper end of the piston rod 28 are thrust against the gripping levers 33 causing same to be locked in position on the lifting arm.

The lifting arm then commences to rise and, by virtue of the connecting rods 22, it carries with it the plunger 19 of the petrol pump.

Petrol is thus supplied to the elevated bowl 10 and this operation proceeds until the supply of pressure fluid to the lifting cylinder is shut off by the automatic movement of the three-way valve 30 to the closed or intermediate position through the medium of the selecting and control mechanism hereinafter described.

When the three-way valve 30 is subsequently moved manually to the discharge position to enable the fluid to be discharged from the lower end of the lifting cylinder 26 the lifting arm 24, the plungers of the lifting cylinder 26 and of the petrol pump 16 and the associated members gravitate to their lowermost positions, which are determined by the automatic closing of the three-way valve 30 in the manner hereinafter set forth.

In cases where the pressure of the working fluid is sufficiently constant, the compensating means may be dispensed with.

*Selecting and automatic control mechanism*

A vertical guide bar 45 of rectangular cross-section is rigidly fixed to the standards 12 and is fitted with a vertically spaced pair of bearings 46 for a vertical selector spindle 47 (Figures 1, 2, 3, 9 and 10).

Suitable means are provided for manually adjusting the angular position of the selector spindle and, in the construction illustrated in the figures just referred to, a pinion 48 secured to an upper portion of the spindle is engaged by a toothed rack 49 which is slidably mounted in suitable guides fitted with a handle 50 whereby it may be readily actuated by the attendant.

The rack may have a graduated outer surface whereby it may readily be set to correspond to any number of gallons within the capacity of the apparatus.

Five cams 51 are secured at regular vertical intervals to the selector spindle 47 below the pinion 48 and the spacing of these cams corresponds with, though it is not necessarily equal to, the gallon calibration of the measuring bowl 10—i. e. about 2½ inches—when the internal diameter of the bowl is 12 inches.

These cams, which are identical in shape, are each provided with one radial projection and the projections on said cams are disposed at progressively increasing angular displacements from a common neutral position 52 (see Figure 18).

A lift block 53, which is adapted to move vertically in proximity to the guide bar 45, is connected to the lower end of a rod 54 the upper end of which is pivoted to a bracket 54' which is adjustable by suitable means along the lifting arm 24, whereby, when the lifting arm 24 is raised and lowered in the manner previously described, the lift block is raised and lowered in unison therewith, though not necessarily through the same distance as the plunger of the pump 16 (Figures 1, 3, 9, 10 and 19). This lift block 53 is provided with an upward projection 55 on which rests the lower pointed end of an oscillatable lift rod 56 which is slidably mounted in bearings 57 secured to the vertical guide bar 45 (Figure 10).

A torsion spring 58 surrounds the upward projection 55 on the lift block 53 and is connected at one end to said lift block and at its other end to an adjacent portion of the oscillatable lift rod.

A vertical control bar 59 is secured to the lift rod 56 and is spaced therefrom by means of a plurality of distance pieces 60 and the tension exerted on the lift rod by the torsion spring 58 serves to maintain one edge of the control bar in engagement with one or more of the selector cams 51.

When the apparatus is in its normal inoperative position, this engaging edge of the control bar bears against the common roots 52 of the cams 51 in the manner indicated in Figure 18 of the drawings.

The upper portion of the control bar 59 is provided with a series of rack teeth 61 the pitch of which corresponds to the spacing of the selector cams 51.

The function of these rack teeth is to actuate mechanism for controlling the three-way valve 30 at a position which is determined by the setting of the selector cams 51.

It will be noted that, when the selector cam spindle is partially rotated from the normal position shown in Figure 18, the control bar 59 is moved angularly outwards by one or more of the cams 51 against the action of the torsion spring 58 at the lower end of the lift rod 56. This outward movement of the control bar results in the three-way valve 30 being moved to its operative position as subsequently explained whereby the pumping operation is commenced.

Figures 9, 10, 21 and 22 illustrate alternative means for effecting the adjustment of the selector cams 51 and in this arrangement a drum 108 secured to the lower end of the selector spindle 47 is fitted with a flexible connection 109 which passes over a guide pulley 110 and is attached to a weight 111.

The weight 111 normally rests on the upper edge of a depressible ground lever 112 which is pivoted to a ground plate 113 said ground lever being fitted with a pivoted balance weight 114 which serves to normally retain the ground lever in its raised position as shown.

If the ground lever should be depressed as shown in broken lines in Fig. 22, as by the wheel 112' of an automobile stopping alongside the pump, the weight 111 is released and in falling it rotates the selector cam spindles 47 to an operative position which, as previously stated, immediately causes the desired volume of petrol to be pumped into the bowl 10.

When this mechanism is employed, the weight 111 and associated parts are preferably arranged so that the cam spindle 47 is moved through its maximum displacement—i. e. so that the measuring bowl 10 will be filled.

The ground plate 113 is preferably pivoted as at 115 so that, when the ground lever is not in use, it may be swung into a vertical position against the side of the apparatus. The weight 111 is restored to its normal position after the pump has been operated by manually returning the cam spindle 47 to its normal inoperative position.

Valve actuating mechanism

A bracket 62 fitted to an upper portion of the guide bar 45, is provided with bearings 63 for guide rods 64 and 65 secured to a trip block 66.

A driving plate 67 is secured to the guide rod 65 below the trip block 66 and this driving plate extends towards the control bar 59 whereby, when the latter is disposed in its inner position, portion of said driving plate is disposed in the path of movement of the rack teeth 61 on the control bar 59.

As previously stated, the control bar 59 is disposed in its inner position when the selector cams 51 are in the neutral position (Figure 18), and accordingly the driving plate 67 is normally supported on the upper rack tooth 61 of the control bar (see Figure 10).

When, however, the control bar is engaging any one of the projections on the cams 51, the rack teeth 61 are disposed out of alignment with the driving plate and upon the outward movement of the control bar the driving plate descends until it engages a stop collar 67' on the bracket 62 (Figure 11).

This downward movement of the driving plate 67, consequent upon the setting of the selector cams, causes the three-way valve 30 to be moved to the "open" position in the manner hereinafter described whereby pressure fluid is supplied to the driving cylinder 26 and the pumping operation automatically commences.

A driving member 68 is slidably mounted on the spindle 65 between the trip block 66 and the driving plate 67, and this driving member 68 is normally maintained in engagement with the trip block 66 by means of a compression spring 69.

A horizontal spindle 70 oscillatably mounted in bearings in the bracket 62 is fitted with a forked member 71 which embraces the slidable driving member 68.

This spindle 70 is fitted at one end with a short hand lever 72 and at its other end with an arm 73 which is connected by a rod 74 with an arm 75 on the three-way valve 30.

A right angled pawl 76 is pivoted to the bracket 62 above the trip block 66 and is formed with a forked depending leg which embraces said trip block and normally lies in the path of movement of the slidable driving member 68.

A regulating screw 77 fitted to the upper face of the trip block 66 is arranged to engage the other arm of the right angled pawl whereby the formed leg of the latter may be moved out of alignment with the slidable driving member 68 when the trip block 66 is raised to a predetermined position.

The weight of the connecting rod 74 or a spring associated therewith tends to move the three-way valve 30 into the open or operative—i. e. the filling—position, but, as previously described, this is normally prevented by means of the driving plate 67 engaging the upper tooth 61 on the control bar 59.

If, now, it is assumed that the selector cam mechanism is set to supply three gallons of petrol, the outward movement of the control bar 59, consequent upon the setting of the selector cams, enables the driving plate 67 to descend until it engages the stop collar 67' and the resulting movement of the associated valve operating mechanism causes the valve 30 to move to the open position, shown in Figure 11 of the drawings.

As the lifting arm 24 rises, the control bar is raised in unison therewith and is retained in the outer position until the lower end thereof passes above the third selector cam 51, whereupon said control bar moves inwards under the influence of the torsion spring 58 whereby the rack teeth are brought into alignment with the driving plate 67.

During the subsequent upward movement of the control bar, that rack tooth which is disposed immediately below the driving plate 67 moves into engagement therewith and commences to raise same together with the trip block 66 and slidable driving member 68.

This upward movement of the slidable driving member 68 results in a partial rotation of the forked member 71, and the consequent movement of the arm 73 and connecting rod 74 causes the three-way valve 30 to commence to close.

After a limited upward movement, the driving member 68 engages the lower end of the pawl 76 and its further upward movement is delayed (Figure 12).

The trip block 66, however, continues its upward movement and the regulating screw 77 thereon then engages the right angled pawl and causes it to be moved angularly to release the slidable driving member 68.

This driving member 68 is thereupon moved rapidly upwards by the compression spring 69 thus causing a further angular movement to be imparted to the forked member 71 which results in the three-way valve 30 being moved into the all-closed intermediate position shown in Figure 23, to prevent the further supply of pressure fluid to the lifting cylinder 26.

The object of the rapid cut-off movement of the three-way valve is to obviate any tendency to assume a balanced position before said valve is completely closed.

Though it is preferred to provide a spring loaded driving member 68 in order to impart a rapid final shut off movement to the valve, it is possible to operate satisfactorily without such rapid movement in which case the driving member 68 is rigidly fitted to the spindle 65 as shown in Figure 15 of the drawings.

The apparatus then remains in the condition above described until the attendant moves the hand lever 72 into the discharge position shown in Figure 13 and this movement of the hand lever causes the driving plate 67 to be further elevated by means of the forked member 71. The lower end of the lifting cylinder is thus opened to waste and the weight of the lifting arm, petrol pump, lift rod and control bar causes said parts to gradually descend to their normal positions, the speed of descent being controlled, if necessary, by regulating the discharge of fluid from the lifting cylinder.

During the descent of the control bar 59, it reengages one of the outwardly directed selector cams 51 and is thus moved outwards against the action of the torsion spring 68 whereby the rack teeth 61 are moved out of alignment with the driving plate 67.

This outward movement of the rack teeth 61 releases a pivoted gravity catch 78 which swings into position below the driving plate 67 (Fig. 13), in order to prevent the latter descending below its intermediate position when it is released in the manner subsequently set forth.

The driving plate 67 is retained in this position by the retaining catch 78 until the control bar 59 returns to its normal or inoperative position (consequent upon cam spindle being manually returned to its normal position), whereupon one of the rack teeth 61 engages the lower end of said catch 78 and restores it to its vertical position and allows the driving plate to descend into engagement with the upper tooth of the series 61 on the control bar (Fig. 10).

The arm 73 associated with the hand lever 72 is pivoted to the lower end of a push rod 81 the upper end of which is fitted with a sleeve which receives the lower end of an intermediate rod 82 which extends through a packing gland and has a cup at its upper end to receive the lower end of the stem of the discharge valve 79 of the petrol bowl 10 (Figure 14).

This arrangement permits of lost motion when the hand lever 72 is disposed in its upper position (i. e. when the three-way valve 30 is opened to permit the passage of pressure fluid to the lower end of the lifting cylinder 26) whilst, on the other hand, the discharge valve 79 is raised against the action of an associated spring when the hand lever is moved from the neutral to the discharge position shown in Figure 14.

It will thus be understood that the measured volume of petrol is discharged from the measuring bowl 10 whilst the lifting arm 24 and associated parts are gravitating to their inoperative lower positions.

When the hand lever is depressed to its discharge position to simultaneously discharge the petrol from the bowl 10 and the pressure fluid from the lifting cylinder 26, it is automatically retained in that position until the lifting arm 24 regains its lowermost position.

For this purpose a locking arm 83 extends upwards from a horizontal pivot 84 fitted to the standards 12 and the arm is weighted or controlled by a spring whereby its upper end is normally in engagement with a projection 85 fitted to the connecting rod 74 on the three-way valve 30 (Figures 10 and 13).

When the connecting rod 74 is raised, consequent upon the depression of the hand lever 72 to the discharge position (Figure 13) the upper end of the locking arm 83 passes below the projection 85 and holds the connecting rod in its raised position.

A release arm 86 rigidly connected to the pivoted locking arm 83 extends outwards therefrom and has a lateral extension at its lower end adapted to be engaged by an inclined surface 87 on the lift block 53.

As the lift block reaches its lowermost or normal position, it engages the release arm 86 and imparts an outward angular movement thereto whereby the locking arm 83 is released from engagement with the projection 85 on the connecting rod 74. The release of the connecting rod 74 thus enables the three-way valve 30 to automatically return to its intermediate position, at the same time allowing the petrol outlet valve 79 to close and the driving plate 68 to descend into engagement with the gravity catch 78.

*Overflow or slip pipe*

A vertical overflow pipe 88 extends through a packing gland into the measuring bowl 10 in the usual manner and its lower end is slidably mounted in a return pipe 89 connected by a branch 90 with the petrol reservoir or tank (not shown).

This overflow pipe is fitted with a laterally projecting handle 91 adapted to be moved angularly to engage a notched measuring rack 92 of approved construction supported on the framework 12 of the apparatus.

The overflow pipe may be raised and lowered manually, as in petrol pumps of the manually operated type, but preferably it is adapted to be raised automatically in unison with the control bar.

For this purpose a vertical lift bar 93 is rigidly connected to and spaced from the overflow pipe and its lower end is adapted to normally rest on an adjusting screw 94 extending upwards from the lift block 53.

Consequently, as the lift block is raised consequent upon the operation of the lifting arm 24, the overflow pipe 88 is raised in unison therewith and the adjusting screw 94 is so disposed that the upper end of the said overflow pipe is raised somewhat above the level corresponding to the volume of petrol required to be measured in the bowl 10.

When the pumping operation is automatically discontinued in the manner previously described, the attendant moves the handle 91 on the overflow pipe into engagement with the appropriate notch in the rack 92. This movement of the handle imparts a partial rotation to the overflow pipe 86 and associated lift bar 93 thereby causing the latter to be moved out of alignment with the adjusting screw 94 on the lift block and permitting of the independent adjustment of said overflow pipe.

If, for example, four gallons have been pumped into the bowl 10, and a customer decides to take only two, the overflow pipe can be moved downwards to the two gallon notch to permit of the excess volume in the bowl being returned to the tank.

A horizontal interlocking bar 95 is slidably mounted on the framework 12 and is provided at one end with a roller 96 adapted to bear against one edge of the lift bar 93 for the overflow pipe 88 (Figures 1, 3, 16 and 17).

When the handle 91 on the overflow pipe is moved into engagement with the rack 92, the lift bar engages the roller 96 and causes the slidable interlocking bar to be moved laterally against the action of a compression spring 97.

The interlocking bar 95 carries a projection 98 which is normally disposed in the path of movement of a lateral projection 99 on the connecting rod 74 of the three-way valve and which serves to prevent the upward movement of the connecting rod into the open position until the handle 91 of the slip pipe has been inserted in the measuring rack 92.

Figures 16 and 16A show the relative positions of the parts prior to the handle 91 engaging the rack 92 whilst Figures 17 and 17A show the relative disposition of the parts when the rack 92 is engaged by the handle and the connecting rod 74 has been raised to move the valve 30 into the discharge position.

An inspection of Figures 17 and 17A will also show that, whilst the connecting rod 74 is raised corresponding to the discharge position of the three-way valve, the return movement of the interlocking bar 95 is prevented, thus ensuring that the overflow pipe 88 is locked in position until the liquid in the bowl has been discharged and the lift block 53 is returned to its lower or normal position.

When the interlocking bar 95 is released consequent upon the three-way valve connecting rod 74 returning to the neutral or all-closed position, the spring 97 restores the interlocking bar 95 to its initial position and, in doing so, engagement between the roller 96 and the lift bar 93 of the overflow pipe causes the handle 91 to be disengaged from the rack 92, whilst, at the same time, the lift bar 93 is again brought into alignment with the adjusting screw 94 on the lift block 53.

The overflow pipe thereupon gravitates to its lower position.

In circumstances where it is desired to leave petrol in the bowl 10 pending its disposal, the delivery means from the bowl may be modified in the manner indicated in Figure 20 of the drawings.

In this construction, a short delivery overflow pipe 100 slidably extends through the bottom of the bowl 10 whilst its lower end projects into a chamber 101 arranged below the bowl and having the petrol delivery pipe 80 connected to the upper end thereof.

An operating rod 102 extends through a gland in the lower end of the chamber 101 and its forked upper end is attached to the lower end of the overflow pipe 100 whilst the lower end of the operating rod is fitted with a control handle 103 adapted to engage a measuring rack 104.

A lateral projection 105 associated with the control handle 103 supports a pivoted depending arm 106 having a cone-shaped trip block 107 which, when the handle 103 is in engagement with its rack, is disposed in proximity to the release arm 86 and to the path of movement of a suitable projection 107' on the lift block 53.

If, for example, five gallons of petrol are in the bowl and three are required by a customer, the slip pipe 100, which is normally raised, is lowered until the control handle 103 engages the third notch in the rack 104, whereby the petrol above the top of the slip pipe is discharged through the passage 80 when the valve 79 is opened.

As the control bar and lift block 53 are descending during the delivery of petrol from the bowl 10, the projection 107' on the lift block 53 engages the cone-shaped trip block 107 which in turn moves the release arm 86 outwards to release the connecting rod 74 which thereupon moves the three-way valve 30 to the neutral position, thus preventing further discharge of liquid from the lifting cylinder 26.

The plunger 19 on the petrol pump is thus prevented from reaching its lowermost position and in fact is retained in a position corresponding to the volume of petrol left in the bowl, so that, when a further actuation of the apparatus is effected, the maximum volume of petrol which can be pumped into the bowl 10 is the additional amount required in order to fill said bowl.

I claim:—

1. Measuring and delivering apparatus for petrol and other liquids comprising an elevated measuring bowl, a reciprocating plunger pump for delivering petrol from a reservoir to said bowl, and air or water cylinder having a reciprocating piston for actuating a pivoted lifting arm, a connection between the lifting arm and the plunger of the pump, a valve manually movable to its operative position to supply air or water under pressure to the cylinder, a control member adapted to be progressively moved during the delivery of petrol to the bowl, manually operable selector means for predetermining the volume of petrol to be delivered to the bowl, said control member being adapted to co-operate with said selector means to cause the valve to be moved to its inoperative position when the volume of petrol predetermined by the selector means is delivered to the bowl.

2. Measuring and delivering apparatus for petrol and other liquids comprising a receptacle, a pump for delivering liquid from a reservoir to the receptacle, a driving cylinder, a piston therein for effecting the operation of the pump and so arranged that one stroke thereof is sufficient to cause the pump to substantially fill the receptacle, valve means for controlling the supply to the cylinder of a fluid under pressure, manually controlled means for actuating said valve means to initiate the operation of the pump, means for predetermining the volume of liquid to be supplied to the receptacle, and automatic control means co-operating with the selecting means for actuating the valve means to discontinue the operation of the pump when the predetermined volume of liquid has been delivered to said receptacle.

3. Measuring and delivering apparatus according to claim 1 wherein a rod on the piston is pivotally connected to the lifting arm and means are provided for automatically varying the position of the pivotal connection therebetween to compensate for variations in the pressure of the air or water supplied to the cylinder.

4. In measuring and delivering apparatus according to claim 1, a movable pivotal connection between the lifting arm and a rod on said piston, a member subjected to the pressure of the air or water and tending to move said pivotal connection in one direction, and resilient means tending to move said pivotal connection in the opposite direction along said lifting arm whereby said pivotal connection will automatically assume a position corresponding to the pressure of said air or water.

5. In measuring and delivering apparatus according to claim 1, a movable pivotal connection between the lifting arm and a rod on said piston, a member subjected to the pressure of the air or water and tending to move said pivotal connection in one direction, and resilient means tending to move said pivotal connection in the opposite direction along said lifting arm, an opposed pair of gripping levers carrying the pivotal connection, said gripping levers being normally closed and slidable on the lifting arm, and means for partly opening said gripping levers whereby they will firmly engage said lifting arm when pressure is applied thereto by the piston of the cylinder.

6. In apparatus according to claim 1, a slot in the lifting arm, a pair of opposed gripping levers extending through the slot in said lifting arm, projections on the upper and lower portions of said gripping levers for firmly engaging said lifting arm when the gripping levers are in a partly open position, means for normally maintaining the gripping levers in the closed position whereby they are free to slide along said lifting arm, one or more wedging blocks adapted to engage the lower portions of the gripping levers, a pivotal connection between the wedging blocks and the piston rod, a member subjected to the pressure of the air or water and tending to move the gripping levers in one direction along said lifting arm and resilient means tending to move said gripping levers in the opposite direction.

7. Measuring and delivering apparatus according to claim 1 wherein the control member is adapted to be moved vertically by means of a link connection with the lifting arm whereby said control member is moved in unison with the delivery of petrol to the measuring bowl.

8. Measuring and delivering apparatus according to claim 1 wherein the cylinder is oscillatively mounted at its lower end and a piston rod projecting upwards from the cylinder is pivotally connected to the lifting arm.

9. Measuring and delivering apparatus according to claim 1 wherein the petrol pump is arranged vertically at a lower portion of the apparatus and the cylinder is arranged thereabove and is oscillatively mounted at its lower end.

10. In measuring and delivering apparatus according to claim 1, a vertical spindle, a plurality of selector cams on the spindle, a drum on the cam spindle, a flexible connection passing from the drum to a weighted member and a depressible ground lever normally supporting said weight and adapted, when depressed, to release said weight whereby the cam spindle will be rotated.

11. In measuring and delivering apparatus according to claim 1, a discharge overflow pipe slidably projecting into said bowl, manually operable means for moving said valve to its discharge position, and means associated with the discharge overflow pipe for automatically moving said valve to its closed position when the lifting arm returns to a position corresponding to an adjusted position of said overflow pipe.

12. Measuring and delivering apparatus for petrol and other liquids comprising a receptacle, a reciprocating plunger pump for delivering liquid to said receptacle and having a displacement volume at least as large as the maximum effective capacity of the receptacle, power actuated means for operating said pump, manually operable selector means for predetermining the volume of liquid to be delivered to the receptacle and for initiating the operation of the power actuated means, and means movable in unison with the pump plunger during the supply of liquid to the receptacle and arranged to cooperate with the selector means to automatically discontinue the operation of the pump when a predetermined volume of liquid has been delivered to the receptacle.

13. Measuring and delivering apparatus for petrol and other liquids comprising a receptacle, a single acting reciprocating plunger pump for delivering liquid to the receptacle and having a displacement volume at least as large as the maximum effective capacity of said receptacle, a driving cylinder, a piston in the cylinder, coupling means for causing said piston and pump plunger to reciprocate in unison, means for supplying a fluid under pressure to said cylinder to actuate the piston therein, manually operable selector means for predetermining the volume of liquid to be delivered to the receptacle and for initiating the operation of the driving cylinder, means cooperating with the selector means to automatically discontinue the operation of the pump when a predetermined volume of liquid has been delivered to the receptacle, and means for imparting a progressive movement to said last mentioned means in unison with the movement of the pump plunger as liquid is being delivered to said receptacle.

14. Measuring and delivering apparatus for petrol and other liquids comprising a measuring bowl, a reciprocating plunger pump for delivering liquid to the bowl, a driving cylinder for actuating the pump, valve means for controlling the supply to the cylinder of a fluid under pressure, a control member arranged to normally maintain the valve means in an inoperative position, means for imparting a progressive movement to the control member during the delivery of liquid to the bowl, manually adjustable selector means for predetermining the volume of liquid to be delivered to the bowl, means operable upon the adjustment of the selector means to cause the valve means to open and allow fluid under pressure to pass to said cylinder, said control member being arranged to actuate the valve and shut off the supply of liquid to the cylinder after said control member has undergone a movement determined by the selector means.

15. In measuring and delivering apparatus according to claim 1, discharge means for the bowl, means for moving said discharge means to its open position and for simultaneously moving the said valve to a discharge position, interlocking means for retaining said discharge means and said valve in said discharge positions and means operable upon the return of the pump plunger to its normal position to release said interlocking means.

16. Measuring and delivering apparatus for petrol and other liquids comprising a receptacle, an overflow pipe extending into the receptacle, a reciprocating plunger pump for delivering liquid to the receptacle and having a displacement volume at least as large as the maximum effective capacity of the receptacle, power means for actuating the pump, means for controlling the operation of the power means, means for raising the overflow pipe in the receptacle during the delivery of liquid thereto, selector means for predetermining the volume of liquid to be delivered to the receptacle, and means movable in unison with the pump plunger during the supply of liquid to the receptacle and arranged to co-operate with the selector means to cause the pump to be stopped when a predetermined volume of liquid has been delivered to the receptacle.

17. In measuring and delivering apparatus according to claim 1, means for varying the leverage exerted on the lifting arm by the air or water cylinder to compensate for variations in the pressure of the air or water supplied to the cylinder.

18. Measuring and delivering apparatus for petrol and other liquids comprising a receptacle, a pump for delivering liquid to the receptacle, power means for acutating the pump, means for controlling the actuation of the power means, a vertically disposed angularly movable spindle, a vertically arranged series of selector cams on the spindle, said cams having a common root position, a vertical control bar mounted for vertical and lateral movements and normally bearing against said cams, means for imparting a progressive vertical movement to the control bar during the delivery of liquid to the receptacle, and means for causing said control bar to move laterally to cause the pump to be stopped when said control member reaches a position determined by the selector cams.

19. Measuring and delivering apparatus for petrol and other liquids comprising a receptacle, a reciprocating plunger pump for delivering liquid to said receptacle, power means for operating said pump, a valve for controlling the power means, actuating means for the valve, manually operable selector means having a vertically disposed series of projections for predetermining the volume of liquid to be delivered to the receptacle, a control member mounted for vertical and lateral movements, means for progressively moving the control member vertically during the delivery of liquid to the receptacle, and means operable when said control member has undergone a vertical movement determined by the selector means for causing said control member to move laterally into operative relation with the valve actuating means to cause the valve to be actuated to discontinue the operation of the pump.

20. Measuring and delivering apparatus for petrol and other liquids comprising a receptacle, a discharge valve for the receptacle, a vertically adjustable overflow pipe for the receptacle, retaining means for holding the overflow pipe in adjusted positions corresponding to different volumes of liquid to be measured, a reciprocating plunger pump for delivering liquid to the receptacle, a driving cylinder, a piston in the cylinder, coupling means for causing said piston and pump plunger to reciprocate in unison, a valve for controlling the supply of a fluid under pressure to said cylinder, actuating means for the valve, selector means for predetermining the volume of liquid to be delivered to the receptacle, means co-operating with the selector means to automatically discontinue the operation of the pump when a predetermined volume of liquid has been delivered to the receptacle, means for imparting a progressive movement to said last mentioned means in unison with the movement of the pump plunger as liquid is being delivered to said receptacle, manually operable means for moving the said receptacle discharge valve to its discharge position to cause the apparatus to return to its normal condition and the liquid to be discharged from the receptacle, and locking means coacting with the said operating means for the discharge valve and with the overflow pipe for preventing the actuation of said operating means until the retaining means for the overflow pipe are operatively engaged.

21. Measuring and delivering apparatus for petrol and other liquids comprising a receptacle, a reciprocating plunger pump for delivering liquid to said receptacle, power means for operating said pump, a valve for controlling the operation of the power means, means for actuating the valve, manually operable selector means for predetermining the volume of liquid to be delivered to the receptacle, a vertically movable control member, means for progressively moving said control member in unison with the pump plunger during the supply of liquid to the receptacle, a plurality of projections on the control member for engagement with the valve actuating means, and means operable when the control member has been moved through a distance determined by the selector means to cause one of said projections to engage the valve actuating member and cause the valve to be actuated to stop the operation of the power means.

22. Measuring and delivering apparatus for petrol and other liquids comprising a receptacle, a single acting reciprocating plunger pump for delivering liquid to said receptacle, said pump having a displacement volume at least as large as the maximum effective capacity of said receptacle, a driving cylinder, a piston in the cylinder for effecting the operation of the pump, a valve for controlling the supply of pressure fluid to one end only of the driving cylinder to effect the power stroke of the pump, the return stroke being effected by the weight of the parts, manually adjustable selector means for predetermining the volume of liquid to be supplied to the receptacle, and means movable in unison with the supply of liquid to the receptacle and co-operating with the selector means to actuate the valve to stop the operation of the pump when a predetermined volume of liquid has been delivered to said receptacle.

23. In measuring and delivering apparatus according to claim 22, a vertically movable control member, a series of vertically arranged selector members adapted for engagement by the control member, and manual means for adjusting the positions of said selector members to determine the position at which the pumping operation will be discontinued.

AUBREY CARLYLE JAMIESON.